United States Patent [19]

Lausch et al.

[11] 4,397,134
[45] Aug. 9, 1983

[54] ROW CROP ATTACHMENT WITH SWEEPER CHAIN

[75] Inventors: H. Nevin Lausch, Denver; Edward H. Priepke, Lancaster, both of Pa.

[73] Assignee: Sperry Corporation, New Holland, Pa.

[21] Appl. No.: 312,029

[22] Filed: Oct. 16, 1981

[51] Int. Cl.³ .............................................. A01D 45/02
[52] U.S. Cl. ........................................................ 56/98
[58] Field of Search ...................... 56/98, 94, 119, 14.3

[56] References Cited

U.S. PATENT DOCUMENTS 4,048,792 9/1977 Shriver et al. ............................ 56/98
4,160,355 7/1979 Blake et al. .............................. 56/98

Primary Examiner—Jay N. Eskovitz
Attorney, Agent, or Firm—Frank A. Seemar; Larry W. Miller; Darrell F. Marquette

[57] ABSTRACT

The crop conveyance path of row crop attachments includes gathering and gripping members moving relative to a floor. The path sometimes becomes clogged between the gathering and gripping members and the floor. A sweeping member is provided between the floor of the path and the gathering members. The sweeping member assists in maintaining a clear crop conveyance path and also assists the gathering and gripping members in stabilizing stalk crop material during conveyance along the path.

6 Claims, 4 Drawing Figures

ROW CROP ATTACHMENT WITH SWEEPER CHAIN

BACKGROUND OF THE INVENTION

This invention relates generally to harvesters of the cornstalk type and, more particularly, to those with cutters and gatherers which may be either endless chains or belts.

Most conventional row crop attachments, especially of the butt-grip type, include a pair of moving, intermeshing conveying means, such as chains or belts which move relative to a floor for conveying the crop along a path to an associated ensilage chopping mechanism. There are basically two major limitations of such attachments. First, under some conditions, soil, downed crop, or undergrowth may become deposited along the path of conveyance between the floor and the conveying means partially obstructing the path and limiting orderly efficient movement of crop material. Second, since the crops are butt-gripped at a point substantially remote from their mass center, the crop stalks are relatively unstable while being conveyed along the path.

The foregoing illustrates limitations of the known prior art. Thus, it is apparent that it would be advantageous to provide an alternative directed to overcoming one or more of the limitations as set forth above.

Accordingly, a suitable alternative is to provide means for keeping the conveyance path clear and for stabilizing the crop stalks during conveyance.

SUMMARY OF THE INVENTION

In one aspect of the present invention, this is accomplished by providing a row crop attachment including a sweeping member and an intermeshing pair of gathering and gripping members moving along a crop conveying path adjacent the floor. The sweeping member also moves along the path and is between the floor and the gathering members.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
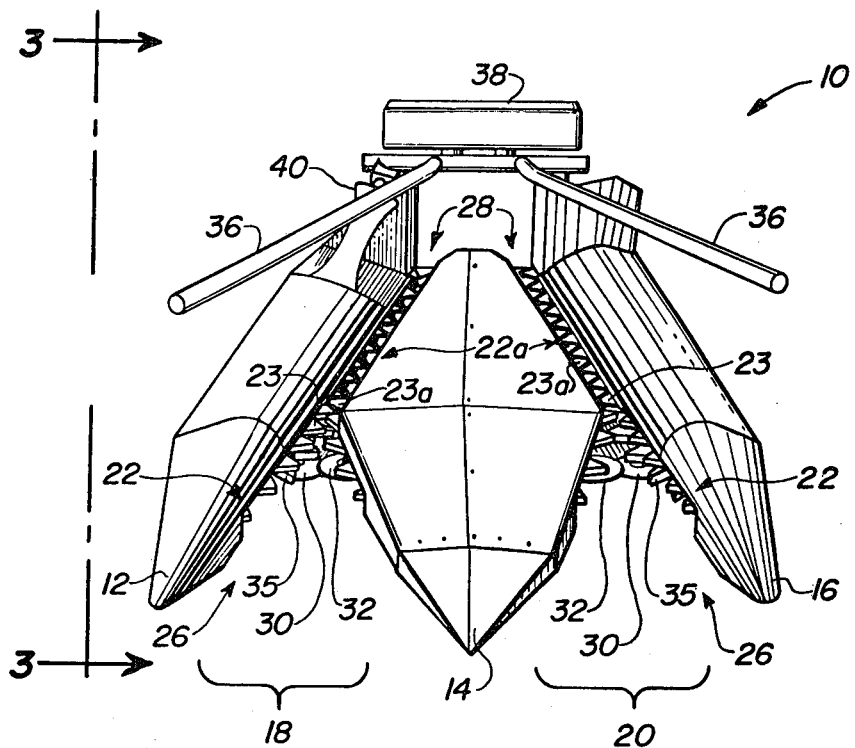
FIG. 1 is a frontal view illustrating an embodiment of the row crop attachment of this invention.
Figure 2:
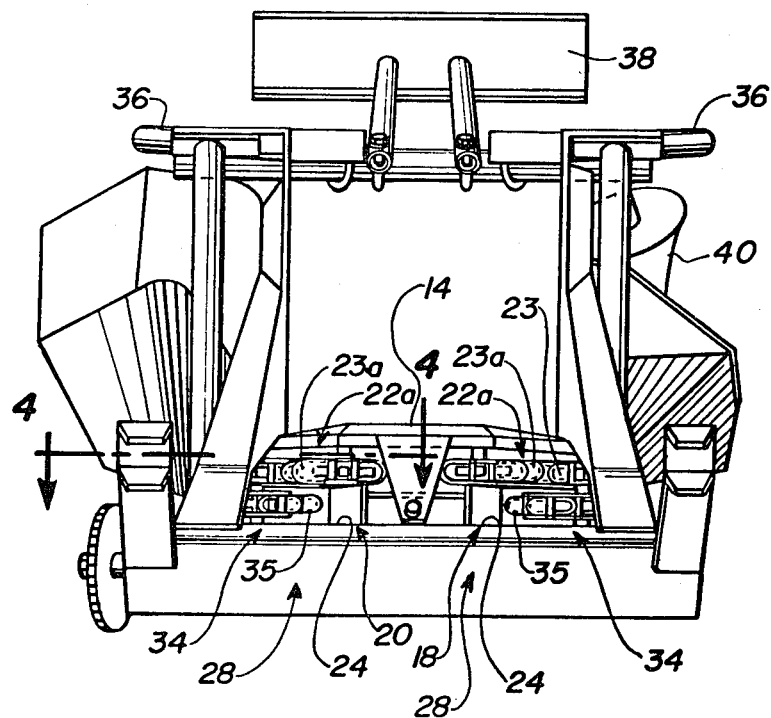
FIG. 2 is a rear view illustrating an embodiment of the row crop attachment of this invention.

Referring now to the drawings, FIGS. 1 and 2 illustrate a row crop attachment 10 including a plurality of row crop dividers 12,14,16 extending in side-by-side relationship. As a result, a crop conveying path 18 is formed between dividers 12,14 and another crop conveying path 20, is formed between dividers 14 and 16. It is well known that attachments similar to that illustrated at 10 can include a varying number of dividers for forming a varying number of crop conveying paths.

Each path 18,20 includes a pair of opposed, intermeshing, endless crop gathering and gripping members 22,22a including lugs 23,23a. A floor 24 extends from one end 26 to another end 28 of said paths 18,20. A pair of rotary knives 30,32 are located adjacent floor 24 at end 26 of paths 18,20. Each path 18,20 also includes an endless sweeping member 34 including lugs 35 located between the floor 24 and the members 22. The members 22 and the members 34 move along the paths 18,20. The members 22 gather and butt-grip the stalks of row crop and move the stalks along the paths 18,20. The sweeping members 34 clear debris from the paths 18,20 and assist in supporting the butt ends of the row crop material being moved along paths 18,20 by members 22.

Attachment 10 also includes a pair of crop guide arms 36 and a cross arm 38 for assisting in feeding the crop material butt first into an associated ensilage chopping mechanism (not shown). A rotary member 40 is provided for limiting stalk material from wrapping around and bunching at end 28 of paths 18,20.

Figure 3:
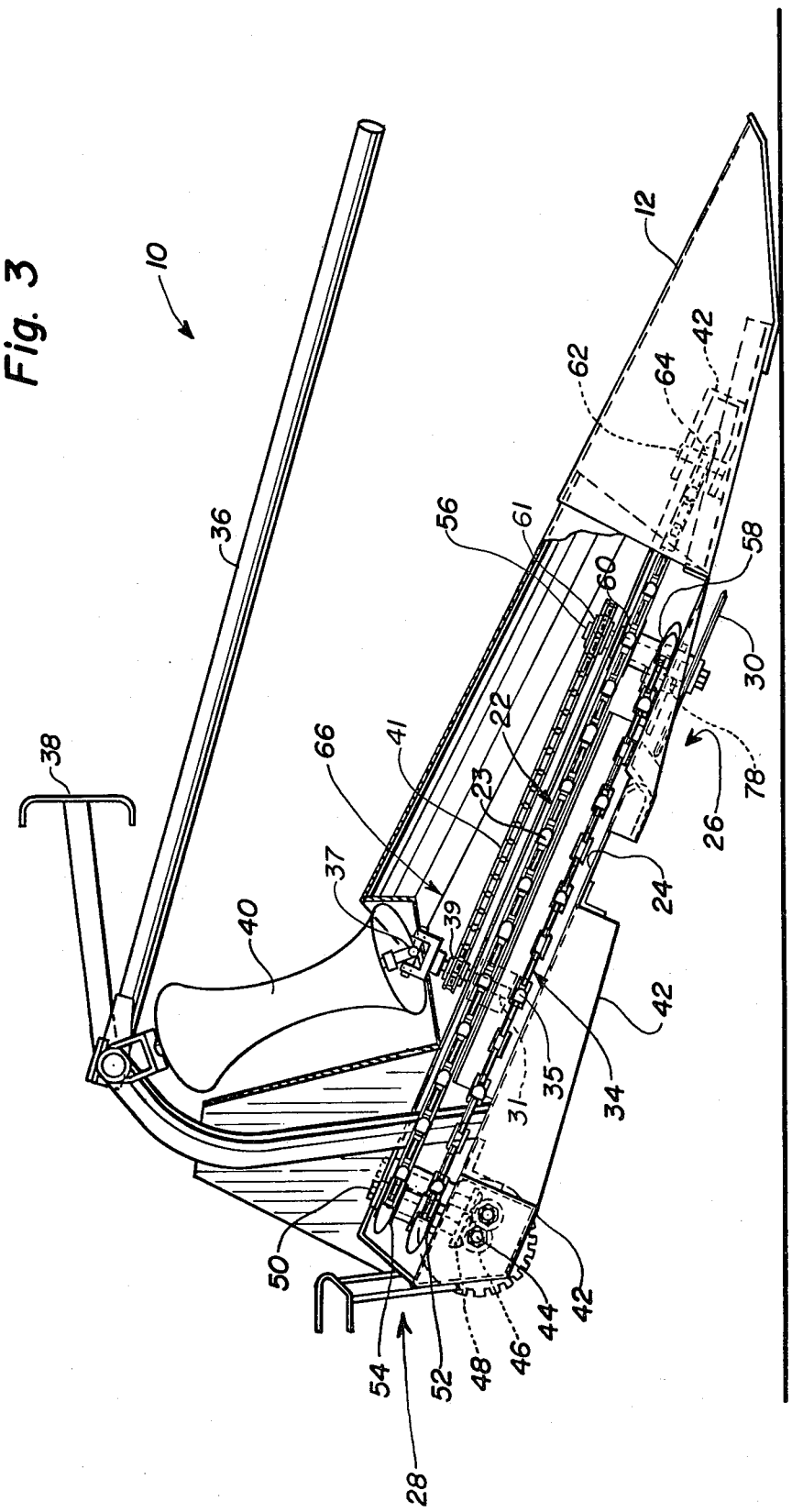
FIG. 3 is a partial side view illustrating an embodiment of the row crop attachment of this invention viewed from line 3—3 of FIG. 1.

In FIG. 3, divider 12 is illustrated and is attached to a steel frame 42. A drive shaft 44 is connected to frame 42 and a bevel gear arrangement 46,48 transmits a rotary motion from drive shaft 44 to a shaft 50 which rotates a pair of stacked sprockets 52,54 mounted thereon. Frame 42 also supports a shaft 56 which similarly rotates stacked sprockets 58,60,61. Another shaft 62 is rotatably supported by frame 42 and carries a sprocket 64. A further shaft 31 is connected to frame 42 and carries sprocket 39. Rotary member 40 is rotatably connected to shaft 56 through a chain drive 41 interconnecting sprockets 39 and 61. A universal connection 37 interconnects member 40 and shaft 31.

Member 22 rotatably interconnects shafts 50,56,62 and their respective sprockets 54,60,64. Also, rotary member 40 is ultimately driven from shaft 56 via chain drive 41. Similarly, sweeping member 34 rotatably interconnects shafts 50,56 and their respective sprockets 52,58. Furthermore, rotary knife 30 is rotatably driven with shaft 56. Floor 24 is supported by frame 42, thus sweeping member 34 is mounted between floor 24 and member 22. It can be seen that, preferably, member 34 carries less lugs 35 than the number of lugs 23 carried by member 22.

Figure 4:
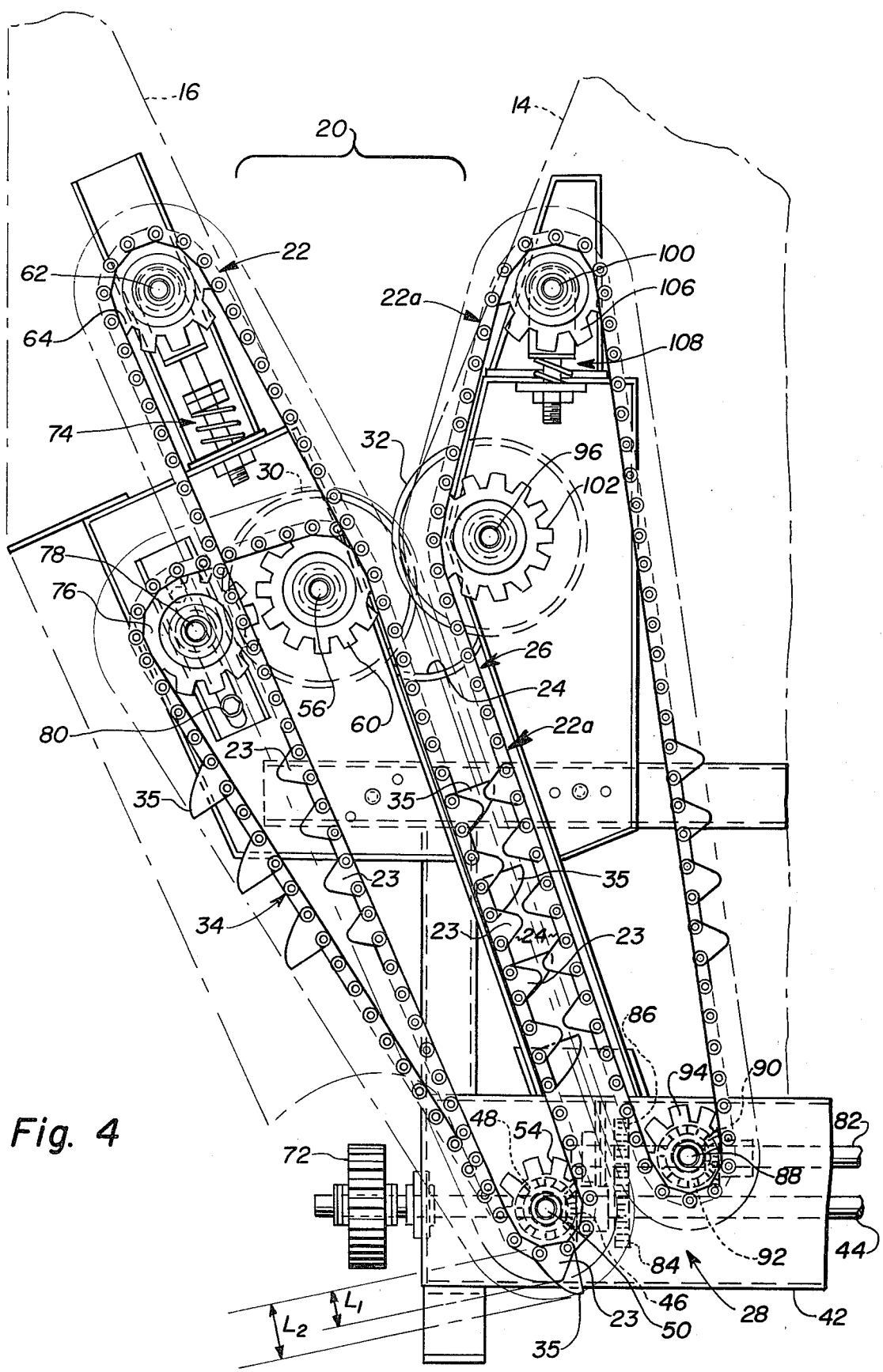
FIG. 4 is a partial plan view diagrammatically illustrating an embodiment of the row crop attachment of this invention viewed from line 4—4 of FIG. 2.

FIG. 4 illustrates only one half of the attachment 10 and the reader is reminded that the following description of divider 16 applies to divider 12 and the description of a half portion of divider 14 applies to the other half portion of divider 14. In FIGS. 3 and 4, it is further disclosed how shaft 44, including member 72, is connected by a drive chain or the like to be driven by a power source on an associated ensilage chopping mechanism (not shown). Therefore, as described above, shaft 44 drives shaft 50 and sprockets 52,54. Member 22 extends in an endless loop engaging sprockets 54,60,64 and it is preferred that sprocket 64 is provided with an adjustment mechanism 74 for adjusting tension in member 22. Member 34 also extends in an endless loop engaging sprockets 52,58 and preferably an idler sprocket 76 rotatably mounted with a shaft 78 which is adjustable by an adjustment mechanism 80 for adjusting tension in member 34. It can be seen in FIG. 4 that it is preferred that the length L2 of lugs 35 is greater than the length L1 of the lugs 23 to substantially span the width of path 20 between floor 24 and gathering member 22.

Shaft 44 also drives an offset shaft 82 through a meshed pair of gears 84,86. Thereafter, shaft 82 drives a shaft 88 via a bevel gear arrangement 90,92. An opposed gathering and gripping member 22a carries lugs 23a and extends in divider 14 in an endless loop engaging a sprocket 94 connected to rotate with shaft 88 and also engaging a plurality of sprockets 102,106 and their respective associated shafts 96,100. Preferably, sprocket 106 is adjustable by means of an adjustment mechanism 108 for adjusting tension in opposed member 22a. Also, rotary knife 32 is rotatably driven with a shaft 96. Thus rotation of shaft 96 due to movement of member 22a, will act through shaft 96 to rotate knife 32.

With the parts assembled as set forth above, it can be seen that row crop attachment 10 comprises a frame 42 and a plurality of row crop dividers 12,14 and 16 extending in side-by-side relationship forming a pair of row crop paths 18,20. A floor 24 is connected to frame 42 and extends from a first end 26 to a second end 28 of paths 18,20. A drive shaft 44 is connected to frame 42.

Means, such as opposed gathering and gripping members 22,22a are provided for gathering and gripping crop material and for moving said crop material along paths 18,20. A pair of members 22,22a are movably mounted in adjacent row crop dividers 12,14 and another pair of members 22,22a are movably mounted in adjacent row crop dividers 14,16. Each of the members 22,22a includes lugs 23,23a. The members 22 of dividers 12 and 16 are supported by shafts 50,56,62 and their respective sprockets 54,60,64 which are driven by drive shaft 44. The members 22a of divider 14 are supported by shafts 88,96 and 100 and their respective sprockets 94,102,106 and are also driven by shaft 44 in cooperation with shaft 82. Lugs 23,23a of the pair of opposed members 22,22a of adjacent row crop dividers 12,14, intermesh along path 18, and the lugs 23,23a of the pair of opposed members 22,22a of adjacent row crop dividers 14,16 intermesh along path 20.

Means, such as sweeping member 34, are provided for assisting members 22,22a for stabilizing crop material moving along paths 18,20 and for clearing paths 18,20 adjacent floor 24. A member 34 is movably mounted in each of the dividers 12,16 which are adjacent divider 14. The members 34 of dividers 12 and 16 are supported by shafts 50,56,78 and their respective sprockets 52,58,76 which are driven by shaft 44. Thus, it can be seen that two of the shafts 50,56, commonly support a member 22 and a member 34.

A pair of rotary knives 30,32 are mounted on adjacent shafts 56,96. Shafts 56 and 96 each support an opposed member 22,22a. One of the knives 30, is thus mounted on shaft 56, which as stated above, supports a member 22 and a sweeping member 34.

A fewer number of lugs 35 are included on member 34 than the number of lugs 23 on member 22. It is not necessary, but it is preferred that lugs 35 are of a greater length than lugs 23.

The rotary means 40 is provided for assisting crop material along path 18. The means 40 is connected to be rotated by shaft 56 which also supports one of the gathering members 22, a sweeping member 34 and one of the rotary knives 30.

The foregoing has described a means for keeping a crop conveyance path clear and for stabilizing the crop stalks during conveyance.

It is anticipated that aspects of the present invention, other than those specifically defined in the appended claims, can be obtained from the foregoing description and the drawings.

Having thus described the invention, what is claimed is:

1. A row crop attachment for cutting and gathering stalk type crops planted in rows, said attachment comprising:
   a frame;
   a plurality of row crop dividers connected to said frame extending in side-by-side relationship forming a row crop path therebetween;
   a floor connected to said frame extending from a first to a second end of said path;
   a drive shaft connected to said frame;
   a pair of crop gripping and gathering members movably mounted in adjacent ones of said row crop dividers, said gripping and gathering members comprising first and second endless chains from which extend a plurality of lugs and being supported by a plurality of shafts and sprockets driven by said drive shaft, said lugs being in intermeshing relationship to grip crop stalks moving along said path;
   a sweeping member movably mounted in one of said row crop dividers, said sweeping member supported by shafts which support one of said gripping and gathering members, said sweeping member having less lugs than said gripping and gathering members, said sweeping member being mounted between said floor and said gripping and gathering members; and
   a pair of rotary knives mounted on adjacent ones of said shafts, each of said adjacent shafts supporting one of said gripping and gathering members, one of said knives being mounted on the same shaft which supports one of said gripping and gathering members and said sweeping member, said knives being positioned adjacent said floor at one end of said path to sever row crop material that comes in contact therewith.

2. The row crop attachment of claim 1 including:
   rotary means for assisting crop material along said path, said rotary means connected to be rotated by said same shaft supporting one of said gathering members, said sweeping member and one of said rotary knives.

3. A row crop attachment for cutting and gathering stalk type crops planted in rows, said attachment comprising:
   a frame;
   a plurality of row crop dividers connected to said frame extending in side-by-side relationship forming a row crop path therebetween;
   a floor connected to said frame extending from a first to a second end of said path;
   a drive shaft connected to said frame;
   means for gripping and gathering crop material and for moving said crop material along said path, said means including a pair of crop gripping and gathering members movably mounted in adjacent ones of said row crop dividers, said gripping and gathering members comprising first and second endless chains from which extend a plurality of lugs and being supported by a plurality of shafts and sprockets driven by said drive shaft, said lugs being in intermeshing relationship to grip crop stalks moving along said path;

means for assisting said gripping and gathering members for stabilizing said crop material moving along said path and for clearing said path adjacent said floor, said means including a sweeping member movably mounted in one of said adjacent row crop dividers, said sweeping member supported by shafts which support one of said gripping and gathering members, said sweeping member being mounted between said floor and said gripping and gathering members; and a pair of rotary knives mounted on adjacent ones of said shafts, each of said adjacent shafts supporting one of said gripping and gathering members, one of said knives being mounted on the same shaft which supports one of said gripping and gathering members and said sweeping member, said knives being positioned adjacent said floor at one end of said path to sever crop material that comes in contact therewith.

4. The row crop attachment of claim 3 wherein said sweeping member having less lugs than said gathering members.

5. The row crop attachment of claim 3 including:

rotary means for assisting crop material along said path, said rotary means connected to be rotated by said same shaft supporting one of said gathering member, said sweeping member and one of said rotary knives.

6. The row crop attachment of claim 4 wherein said lugs on said gathering members are of a first length and said lugs on said sweeping member are of a second length greater than said first length.

* * * * *